United States Patent [19]
Khalifa et al.

[11] Patent Number: 6,056,320
[45] Date of Patent: May 2, 2000

[54] ENERGY ABSORBING OCCUPANT RESTRAINT SYSTEM

[75] Inventors: Mustafa A. Khalifa, Dearborn; Kenneth Budowick, Clinton Township; Srinivas Reddy Malapati, Southfield; John P. Paris, Fenton; Oscar H. Sharp, Sterling Heights, all of Mich.

[73] Assignee: Chrysler Corporation, Auburn Hills, Mich.

[21] Appl. No.: 09/178,119

[22] Filed: Oct. 23, 1998

[51] Int. Cl.⁷ ..................................................... B60R 22/28
[52] U.S. Cl. ............................................................. 280/805
[58] Field of Search ..................................... 280/805, 806

[56] References Cited

U.S. PATENT DOCUMENTS

| | | | |
|---|---|---|---|
| 3,438,674 | 4/1969 | Radke et al. | 280/805 |
| 3,649,786 | 3/1972 | Mauron | 280/805 |
| 3,938,627 | 2/1976 | Nagazumi | 280/805 |
| 4,239,260 | 12/1980 | Hollowell | 280/805 |
| 4,886,296 | 12/1989 | Brodmann | 280/805 |
| 5,580,091 | 12/1996 | Doty | 280/805 |

*Primary Examiner*—Kenneth R. Rice
*Attorney, Agent, or Firm*—James R. Yee

[57] ABSTRACT

An energy absorbing occupant restraint system for a motor vehicle includes a load-limiting buckle assembly. The buckle assembly includes a first elongated member adapted to be secured to the floor of the motor vehicle and a second elongated member. The buckle assembly further includes a buckle attached to the first elongated member. The buckle is adapted to releasably engage a tongue assembly carried by a seat belt webbing. A connector member interconnects the first and second elongated members. The second elongated member is configured so as to incrementally allow the second elongated member to translate relative to the first elongated member when the first elongated member is acted upon by a load which exceeds a predetermined level. In the preferred embodiment, the second elongated member is a sleeve member which telescopically receives the first elongated member. The sleeve member has an elongated aperture with a plurality of deflectable tangs which resist deflection until acted upon by a predetermined load.

14 Claims, 3 Drawing Sheets

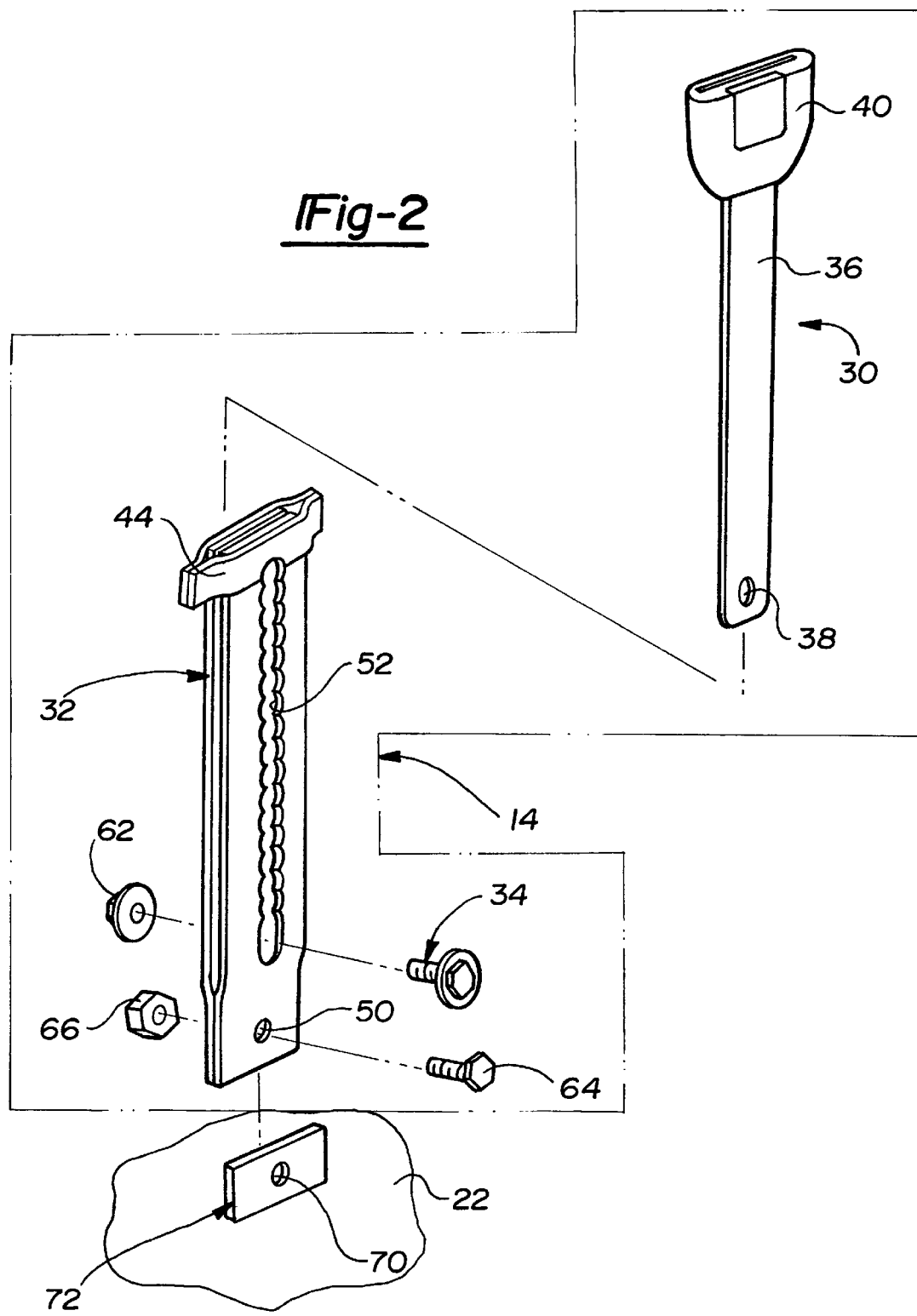

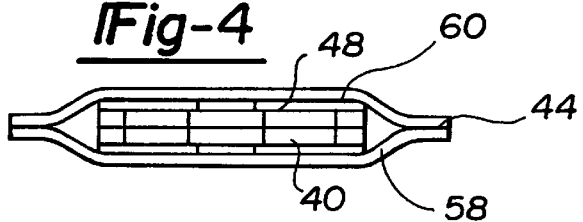
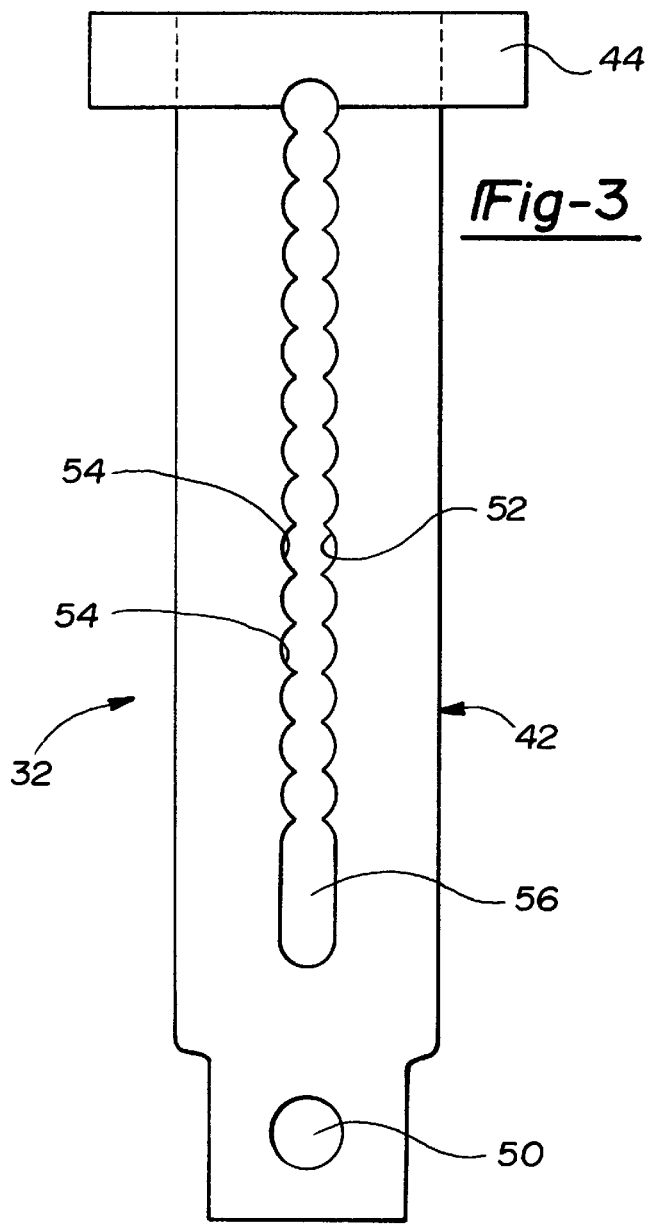
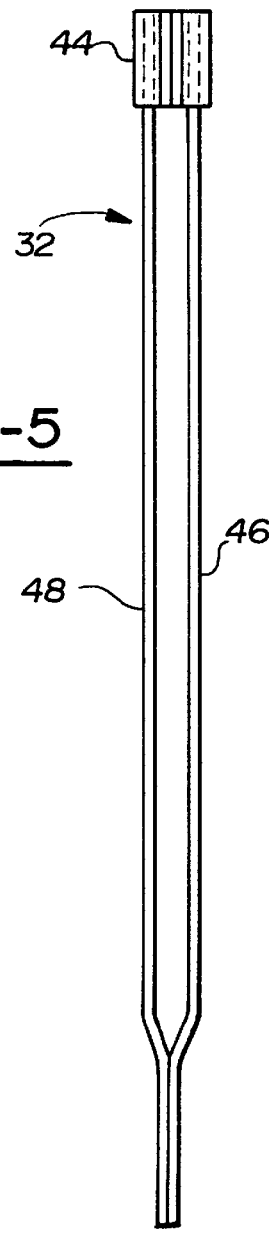

ENERGY ABSORBING OCCUPANT RESTRAINT SYSTEM

BACKGROUND OF THE INVENTION

1. Technical Field

The present invention relates generally to motor vehicles. More particularly the present invention relates to an energy absorbing occupant restraint system for a motor vehicle.

2. Discussion

A large number of energy absorbing occupant restraint systems have been proposed. Many of these devices have been too large to effectively package within a motor vehicle or they have been too costly to manufacture. One known arrangement is disclosed in U.S. Pat. No. 5,580,091 to Doty which teaches the use of an energy dissipating device in combination with a conventional seat belt retractor. This device dissipates a portion of the energy that is exerted on the vehicle occupant through a shoulder belt portion of the harness.

While certain known devices may reduce the loads otherwise transferred to a vehicle occupant, they are all associated with disadvantages and/or limitations. For example, many known devices are not designed to absorb loads transferred from a lap portion of a seat belt webbing. Another problem with known devices concerns the need for a harness retractor for integration into a vehicle. While retractors are commonly employed at several seating positions within a vehicle, they are not universally used in every vehicle or at every seating position. As such, many known devices can not be incorporated into some vehicles or at some seating positions. Other known devices are cost prohibitive.

Consequently, there remains a need in the art for an inexpensive energy dissipation device which does not require the use of a retractor, which can be easily integrated into a vehicle and which can effectively dissipate the energy transmitted through a safety restraint on a significant basis.

SUMMARY OF THE INVENTION

It is a general object of the present invention to provide an occupant restraint system incorporating an improved load limiting device for dissipating energy.

It is another object of the present invention to provide a load-limiting device which is easily integrated into a motor vehicle.

It is another object of the present invention to provide a load-limiting device which does not require the use of a retractor.

In accordance with the teachings of the present invention, an inexpensive, easily integrated, load-limiting device is provided for dissipating a portion of the energy imparted to the harness by the forward thrust of a restrained motor vehicle occupant in instances of rapid deceleration of the vehicle so as to reduce the maximum force exerted on the vehicle occupant.

In one form, the present invention provides an energy absorbing buckle assembly for a motor vehicle having a seat belt webbing carrying a tongue assembly. The buckle assembly includes a first elongated member and a second elongated member. The first elongated member is adapted to be secured to a floor of the motor vehicle. The energy absorbing buckle assembly additionally includes a buckle attached to the first elongated member. The buckle is adapted to releasably engage the tongue assembly. A connector member interconnects the first and second elongated members. The second elongated member is configured so as to incrementally allow the second elongated member to translate relative to the first elongated member when the first elongated member is acted upon by a load which exceeds a predetermined level.

In the preferred embodiment, the load-limiting restraint buckle is formed from a buckle assembly having a strap with an aperture and a sleeve assembly also having an aperture. The sleeve aperture extends axially along a portion of the sleeve assembly and contains a plurality of tangs. The device of the present invention is formed by inserting the strap portion of the buckle assembly into the sleeve assembly, placing a deforming member through the apertures in the sleeve assembly and strap and securing the deforming member so as to retain the deforming member, sleeve assembly and strap together. Since the sleeve assembly is preferably a stamped sheet metal product, the resulting assembly is relatively inexpensive. As the assembled load-limiting restraint buckle is of approximately the same dimensions as a conventional buckle assembly (i.e., a buckle assembly that does not have loadlimiting characteristics), the device is easily integrated into a vehicle.

In operation, when a vehicle experiences rapid deceleration, such as in a collision, the forward momentum of the vehicle occupant causes the occupant to be forced against the harness of the restraint system. The force exerted on the harness tends to cause relative movement between the strap and the sleeve. This relative movement is resisted until a sufficiently large force is applied to the harness. Upon the application of a force in excess of a predetermined threshold level, the deforming member will cause a first pair of tangs to deform or shear, thereby allowing a small amount of relative movement between the strap and sleeve until the deforming member contacts another pair of tangs in the sleeve. As energy is required to deform or shear the tangs, the device effectively absorbs energy otherwise transferred to the vehicle occupant.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 2 is an exploded view of a buckle assembly of the safety restraint system of FIG. 1, including a portion of the vehicle floor pan to which the buckle is fastened.

FIG. 3 is a front view of a sleeve member of the buckle assembly of FIG. 2.

FIG. 4 is a top view of the sleeve member of FIG. 3.

FIG. 5 is a side view of the sleeve member of FIG. 3.

DETAILED DESCRIPTION OF THE PREFERRED EMBODIMENT

Figure 1:
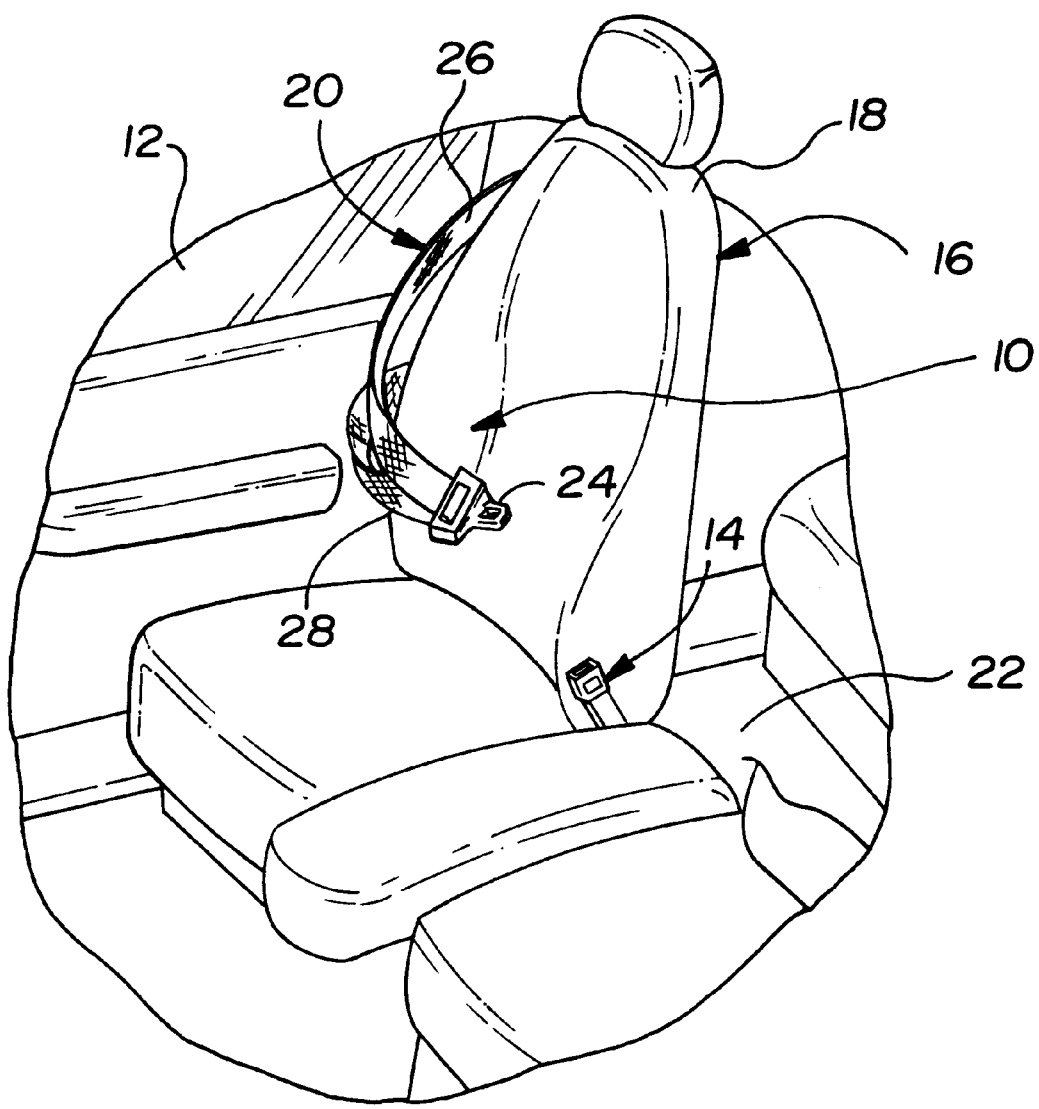
FIG. 1 is an environmental view of an energy absorbing safety restraint system constructed in accordance with the teachings of a preferred embodiment of the present invention shown incorporated into an exemplary motor vehicle.

With reference to the environmental view of FIG. 1, an energy absorbing occupant restraint system constructed in accordance with the teachings of a preferred embodiment of the present invention is generally identified with reference numeral 10. The occupant restraint system 10 is shown operatively associated with an exemplary motor vehicle 12.

The present invention is particularly directed to a load-limiting buckle assembly 14 of the occupant restraint system 10. Prior to addressing the construction and function of the buckle assembly 14, a brief understanding of the remaining components of the occupant restraint system 12 is warranted.

As illustrated in FIG. 1, the occupant restraint system of the present invention is preferably shown as a three-point vehicle safety belt system 10 for restraining forward movement of a vehicle occupant (not shown) in the event of deceleration of the vehicle 12 above a predetermined magnitude, such as occurs in a vehicle collision or severe braking. It should be understood that the present invention could be applied to other safety belt systems. A vehicle seat is illustrated as a front driver seat 16 in the vehicle 14. The vehicle seat 16 is of conventional construction including a seat back 18.

The vehicle safety belt system 10 includes a length of seat belt webbing 20 which is extendable about the vehicle occupant (not shown) in a conventional manner. While not specifically shown, it will be understood that the seat belt webbing 20 is conventionally anchored to the floor of the vehicle body, passes through a D-ring positioned along the vehicle B-pillar and extends vertically downward to a seat belt retractor (not shown) of known construction. A tongue assembly 24 is carried by the seat belt webbing 20 and is adapted to be received in the buckle assembly 14. When the tongue assembly 24 and the buckle assembly 14 are joined, a shoulder belt portion 26 of the seat belt webbing 20 extends from the tongue assembly 24 diagonally across the torso of the occupant and a lap belt portion 28 horizontally extends across the waist of the occupant in a conventional manner.

With continued reference to FIG. 1 and additional reference to FIGS. 2–4, the load-limiting buckle assembly 14 is shown to generally include a buckle portion 30. The buckle assembly 14 additionally includes a sleeve member or portion 32 and a connecting member or deflecting member 34. The buckle portion 30 includes a strap 36 which is telescopically received by the sleeve portion 32. The strap 36 includes an aperture 38 at one end thereof and a conventional buckle 40 fixed to the opposite end.

The sleeve assembly 32 is shown to include a main body portion 42 and a reinforcing band 44. The main body portion 42 includes first and second sleeve sides 46 and 48 which are preferably stamped steel fabrications. As particularly shown in FIG. 3, each sleeve side 46 and 48 is shown to include a mounting aperture 50 and an elongated slot 52. The elongated slots 52 extend longitudinally along a substantial length of the sleeve sides 46 and 48 and include a plurality of constrictions which are illustrated in the exemplary embodiment as a plurality of tangs 54. The tangs 54 are arranged in pairs on opposing sides of the elongated slot 52. The elongated slot 52 is preferably shown to have an initial design position identified at reference numeral 56. FIG. 4 shows the band 44 to include first and second band sides 58 and 60. Each band side 58 and 60 is contoured to conform to the exterior dimensions of the corresponding sleeve sides 46 or 48 and is also preferably a stamped steel fabrication.

The sleeve assembly 14 is fabricated by securing band sides 58 and 60 to their respective sleeve sides 46 and 48, positioning the sleeve sides 46 and 48 so as to align the mounting apertures 50 and the elongated slots 52, and then securing sleeve sides 46 and 48 together, preferably through spot welding. The strap 30 is then inserted into sleeve assembly 32 and positioned such that the strap aperture 38 is aligned with the initial design position 56 in the elongated slot 52. The deflecting member 34 which is preferably illustrated as a fastener such as bolt, is placed into strap aperture 38 and the elongated slot 52 and secured to sleeve assembly 32, preferably by nut 62, so as to retain the strap 18 within sleeve assembly 32. As assembled, the deflecting member 34 effectively prevents relative movement between the sleeve assembly 32 and the strap 30 until such time that a load in excess of a predetermined threshold is exerted on the load-limiting buckle assembly 14.

The load-limiting buckle assembly 14 is subsequently installed into a vehicle 12 by securing the sleeve assembly 32 through any appropriate securing means to a structural element 72 of the vehicle 12. In the exemplary arrangement shown in the drawings, a bolt 64 and nut 66 are used as the securing means. The bolt 64 is placed through the mounting aperture 50 of the sleeve assembly 32 and an aperture 70 provided in a mounting member 72 upwardly extending from the floor pan 22. The nut 66 is tightened so as to rigidly fix load-limiting buckle assembly 14 and the vehicle floor pan 22 together. As the load-limiting buckle assembly 14 is of comparable size to conventional buckle assembly (i.e., a restraint buckle without load-limiting characteristics), integration of the present invention into a vehicle is completed with relative ease.

In operation, the seat belt webbing 20 is properly positioned around the vehicle occupant and the tongue assembly 24 is fastened to the buckle assembly 14, thereby connecting the seat belt webbing 20 to load-limiting buckle assembly 14. When the vehicle 12 experiences rapid deceleration, such as in a collision, the forward momentum of the vehicle occupant causes the vehicle occupant to be forced against the seat belt webbing 20 of the restraint system 10. The force exerted on the seat belt webbing 20 tends to cause relative movement between the buckle assembly 14 and the sleeve assembly 32. This relative movement, however, is resisted by the deflecting member 34 and the tangs 54 in the elongated slots 52 until a sufficiently large force is applied to the seat belt webbing 20. Upon the application of a force in excess of a predetermined threshold level, the deflecting member 34 will cause a first pair of tangs 54 (i.e., those immediately adjacent the initial design position 56) to deform or shear, thereby allowing a small amount of relative movement between the buckle assembly 14 and sleeve assembly 32 until the deflecting member 64 contacts the next pair of tangs 54 in the sleeve assembly 32. As energy is required to deform or shear the tangs 54, the load-limiting buckle assembly 14 effectively absorbs energy, thus reducing energy otherwise transferred to the vehicle occupant.

Relative movement between the strap 36 and sleeve assembly 32 is halted when the deflecting member 34 contacts a second pair of tangs 54. If the energy exerted by the seat belt webbing 20 to the vehicle occupant has diminished below the threshold level, relative movement will terminate when the deflecting member 34 contacts this next pair of tangs 54. Otherwise, the deflecting member 34 will cause the second pair of tangs 54 to shear or deflect and the deflecting member 34 will advance to a next pair of tangs 54. Thus, relative movement and energy dissipation will continue until such time as the maximum energy exerted by the seat belt webbing 20 drops below the predetermined threshold level.

Alternative to the plurality of tangs 54 shown in the exemplary embodiment for absorbing energy, the present invention may include webs of material which extend laterally across the elongated slot 52. In such an arrangement, fracturing of the webs will absorb energy in a manner similar to shearing or deflection of the tangs 54. In another alternative arrangement a shearable material such as a thin gauge metal may be secured to the sleeve assembly 32 so as to cover the elongated slot 52. In this arrangement, the fastener 34 will tear through the material so as to absorb energy during a collision, for example.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An energy absorbing buckle assembly for a motor vehicle having a seat belt webbing carrying a tongue assembly, the buckle assembly comprising:

a first elongated member adapted to be secured to a floor of the motor vehicle;

a second elongated member;

a buckle attached to said first elongated member, said buckle adapted to releasably engage the tongue assembly; and a connector member interconnecting said first and second elongated members;

said second elongated member configured so as to incrementally allow said second elongated member to translate relative to said first elongated member when said first elongated member is acted upon by a load which exceeds a predetermined level and otherwise to prevent said second elongated member from translating relative to said first elongated member.

2. The energy absorbing buckle assembly of claim 1, wherein said first and second elongated members are telescopically related.

3. The energy absorbing buckle assembly of claim 1, wherein one of said first and second elongated members defines an elongated slot, the other of said first and second elongated members defines an aperture and said connecting member passes through said elongated slot and said aperture.

4. The energy absorbing buckle assembly of claim 3, wherein said second elongated member defines said elongated slot.

5. The energy absorbing buckle assembly of claim 3, wherein said elongated slot includes at least one constriction for impeding translation of said connection member along said elongated slot.

6. The energy absorbing buckle assembly of claim 5, wherein said at least one constriction comprises a plurality of tangs arranged to deflect or shear under said load.

7. An occupant restraint system for a motor vehicle comprising:

a seat belt webbing adapted to be attached to the motor vehicle;

a tongue assembly carried by the seat belt webbing; and a buckle assembly including:

a first elongated member adapted to be secured to a floor of the motor vehicle;

a second elongated member;

a buckle attached to said first elongated member, said buckle adapted to releasably engage the tongue assembly; and a connector member interconnecting said first and second elongated members;

said second elongated member configured so as to incrementally allow said second elongated member to translate relative to said first elongated member when said first elongated member is acted upon by a load which exceeds a predetermined level and otherwise to prevent said second elongated member from translating relative to said first elongated member.

8. The occupant restraint system of claim 7, wherein said first and second elongated members are telescopically related.

9. The occupant restraint system of claim 7, wherein one of said first and second elongated members defines an elongated slot, the other of said first and second elongated members defines an aperture and said connecting member passes through said elongated slot and said aperture.

10. The occupant restraint system of claim 9, wherein said second elongated member defines said elongated slot.

11. The occupant restraint system of claim 9, wherein said elongated slot includes at least one constriction for impeding translation of said connection member along said elongated slot.

12. The occupant restraint system of claim 11, wherein said at least one constriction comprises a plurality of tangs arranged to deflect or shear under said load.

13. An energy absorbing occupant restraint system for a motor vehicle, the occupant restraint system comprising:

a seat belt webbing mounted to said vehicle and having at least a lap belt portion;

a tongue assembly carried by said seat belt webbing;

a buckle assembly mounted to said vehicle, said buckle assembly including a sleeve member having an elongated aperture with a plurality of deflectable tangs which resist deflection until acted upon by a predetermined load, and a buckle for releasably engaging said tongue assembly;

a strap, said strap having a mounting aperture at a first end and fixed to said buckle at a second end; and a connecting member positioned through said mounting aperture and said elongated aperture and securing said strap and said sleeve member together, said connecting member being incrementally translatable relative to said sleeve member when acted upon by a load which exceeds a predetermined level required to deflect said tangs so as to dissipate an amount of energy transferred from said seat belt webbing to said buckle assembly.

14. The energy absorbing occupant restraint system of claim 13, wherein said sleeve member telescopically receives said strap.

* * * * *